United States Patent [19]
Mahan

[11] 3,750,702
[45] Aug. 7, 1973

[54] FLUIDIC RESISTANCE-CAPACITANCE DEVICE

[75] Inventor: Guy S. Mahan, Rio Rancho Estates, N. Mex.

[73] Assignee: International Basic Economy Corporation, Akron, Ohio

[22] Filed: Oct. 26, 1971

[21] Appl. No.: 192,363

[52] U.S. Cl..................... 137/608, 137/825, 138/43
[51] Int. Cl................................................ F17d 1/00
[58] Field of Search........................ 138/43, 45, 46; 137/81.5, 608

[56] References Cited
UNITED STATES PATENTS

| | | | |
|---|---|---|---|
| 3,657,880 | 4/1972 | Greune | 138/43 X |
| 1,980,085 | 11/1934 | Perry et al. | 138/43 |
| 2,568,123 | 9/1951 | Goldberg | 138/43 |
| 1,957,828 | 5/1934 | Greenwald | 138/43 X |
| 2,587,016 | 2/1952 | Watts | 138/43 X |
| 2,956,647 | 10/1960 | Barthlomaus | 138/43 X |
| 2,997,059 | 8/1961 | Mortimer | 138/43 X |
| 3,095,006 | 6/1963 | Smith | 138/43 X |
| 3,144,879 | 8/1964 | Baumann | 138/43 |
| 3,562,282 | 2/1971 | Zychal | 138/43 |

*Primary Examiner*—Samuel Scott
*Attorney*—Alan N. McCartney

[57] ABSTRACT

A device for interposing a variable resistance and variable capacitance function in a fluid flow line wherein the resistance and capacitance are reciprocal functions of one another. The device comprises a closed cylinder having a piston rod and an adjustable piston within the cylinder defining a capacitive cavity therein and including metering or valve means comprising mating threads between the piston rod and the piston for adjustment of the resistance to fluidic flow through the threads and in reverse function to the capacitance in the device.

6 Claims, 7 Drawing Figures

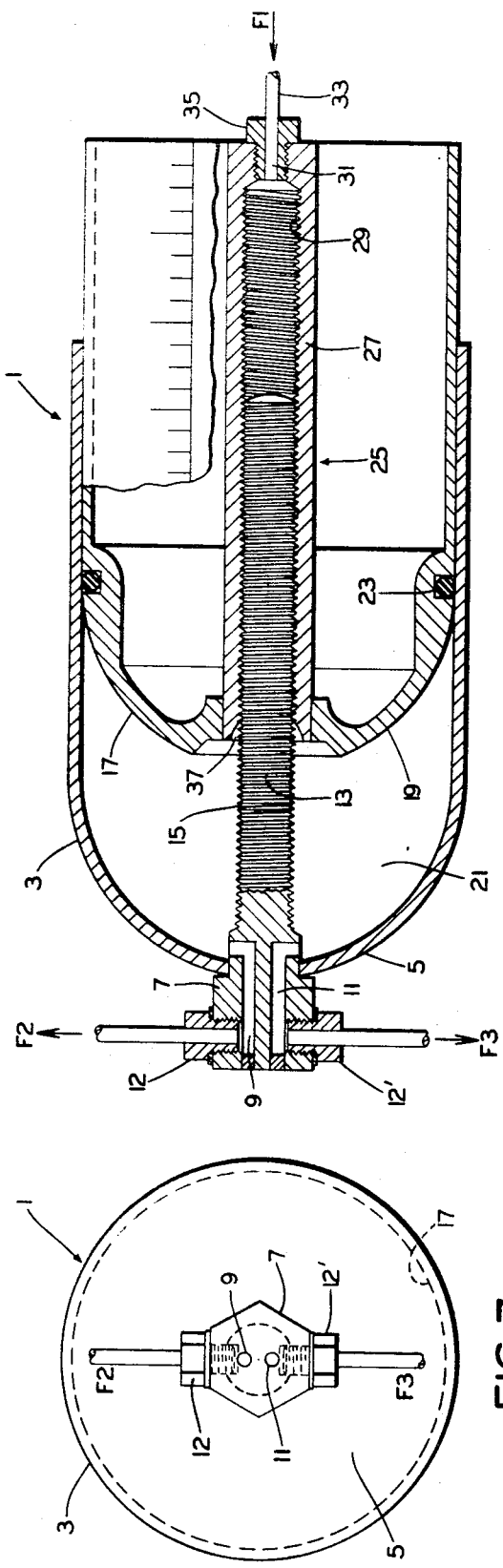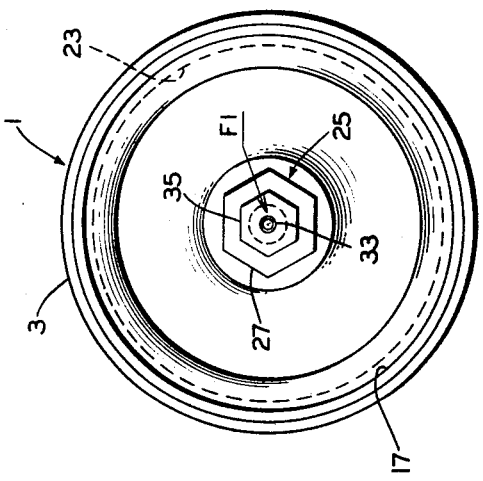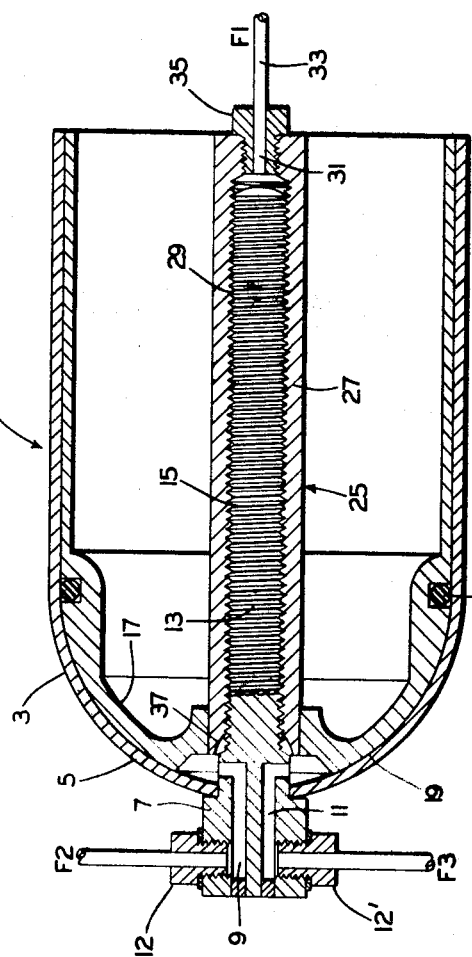

FLUIDIC RESISTANCE-CAPACITANCE DEVICE

BACKGROUND OF THE INVENTION

This invention pertains to the field of fluid flow and more particularly to devices for altering the dynamic characteristics of fluid flow such as the resistance to flow, dampening of extraneous variations in pressure and flow, and time delay from the occurrence of a specific event.

In the field of fluid dynamics it is known to control the movements of various equipment by the use of a fluid line and fluid control devices that link a master station to slave stations that perform programmed functions in response to variations in fluid flow, fluid pressure, etc. emanating from the master station.

In fluid control devices of this general type there has been a continuing problem with the need for various dampening devices and control devices to perform functions such as delaying the time in which a certain event occurs with respect to fluid flow, dampening extraneous variations in the fluid dynamics of the fluid, and interposing various components in the fluid line. Difficulties have arisen because of the requirement for extremely sophisticated devices to perform these relatively simple functions. Part of this sophistication is required merely to hold the positioning element of the control device in its base mode such as to hold a set point, reference temperature, etc. Other difficulties arise due to dirt and foreign matter getting into the lines and plugging or otherwise deleteriously affecting the operation of these rather fragile, sophisticated devices. Even further is the difficulty in achieving more than one function in a single device and the necessity of joining many devices, each with a separate control set point circuit of its own, to perform the needed functions.

The main object of this invention is a device that performs dual functions in a specified relationship that may be easily set and maintained without the requirement for ultra-sophisticated monitoring devices. Other objects of the invention include a rather simple device for interposing resistance and capacitance in reciprocal relationship into a fluid flow line such that the functions are easily and manually adjustable and thereafter operate uniformly without the requirement of monitoring devices. Still further objects of the invention include a means of interposing resistance or valve means and capacitance functions of a reciprocal nature into a fluid flow line either in a resistance-capacitance function or a capacitance-resistance function wherein the device is amenable for passage and control of fluids of wide viscosity and compressability limits. These and other objects of the invention will become more apparent upon reading the description of the preferred embodiments in conjunction with the drawings that are attached hereto.

DESCRIPTION OF THE DRAWING

FIG. 1 is a cross sectional view of one embodiment of the device of this invention.

FIG. 2 is a cross sectional view illustrating the resistance-capacitance function of the device.

FIG. 6 is an end view of the device of this invention.

FIG. 7 is another end view of the device of this invention.

SUMMARY OF THE INVENTION

Figure 3:
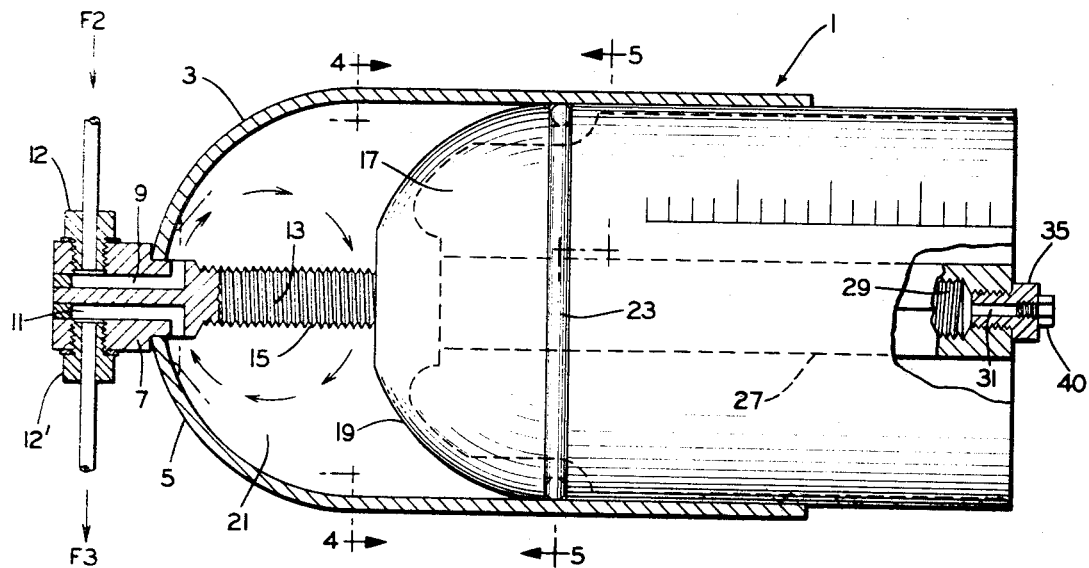
FIG. 3 is a cross sectional view with the addition of schematic circuitry showing the capacitance function of this device.
Figure 4:
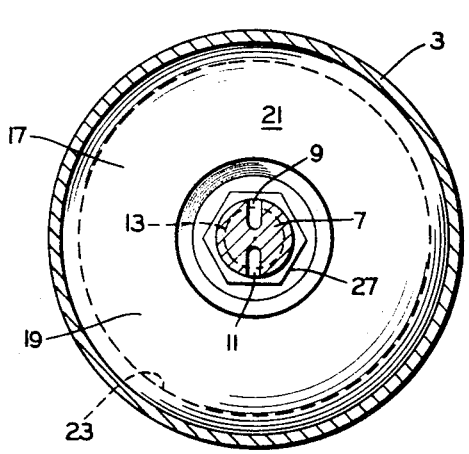
FIG. 4 is a sectional view taken along the line 4—4 of FIG. 3.
Figure 5:
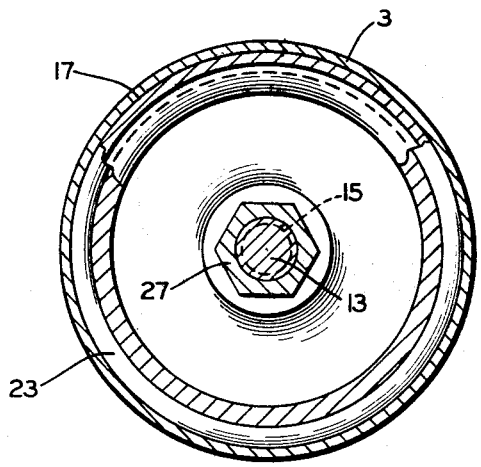
FIG. 5 is a sectional view taken along the line 5—5 of FIG. 3.

This invention concerns an adjustable fluidic resistance-capacitance device comprising first and second fluid conduit means and means for producing a variable resistance to fluid flow therebetween and for interposing a variable capacitance therebetween wherein said resistance and said capacitance are reciprocal functions of one another comprising a cylinder closed at one end, the closed end in fluid communication with one of the fluid conduit means, a piston rod in the cylinder, an adjustable piston in the cylinder defining a cavity with the closed end, and metering means including mating threads on the piston rod and the piston capable of being adjusted to vary the resistance to fluid flow between the other fluid conduit means and the cavity in reverse function to the volume of the cavity.

DESCRIPTION OF THE PREFERRED EMBODIMENT

The adjustable fluidic resistance-capacitance device of this invention may be used in any of three modes, that being a fluidic resistance-capacitance device, a fluidic capacitance-resistance device, and an adjustable capacitance device. These three modes of operation will be described in conjunction with the drawings attached hereto.

Referring now to the drawings wherein like numerals identify like elements throughout the three drawings, the adjustable fluidic resistance-capacitance device of this invention is noted generally at 1 and comprises first, second and third fluidic conduit means F1, F2 and F3 that are interconnected through a novel resistance and capacitance circuit. This circuitry comprises a cylinder 3 having a closed end 5 wherein the closed end is in fluid communication with at least one of either the second or third fluidic conduit means F2 or F3. These second and third fluid conduit means, F2 and F3, are supported at closed cylinder end 5 by mounting nut 7 that contains internal passage ways 9 and 11 that communicate second and third fluid conduit means F2 and F3 into the space occupied by closed end 5 of cylinder 3 by means of couplings 12 and 12'. Passageways 9 and 11 open into closed cylinder end 5 facing in opposite directions. Positioned inside of cylinder 3 is piston rod 13 carried on mounting nut 7 and extends from closed end 5 through cylinder 3 a length that is variable depending upon the required total resistance desired in the circuit. As shown, piston rod 13 is mounted directly to mounting nut 7, however, it may be mounted on another portion in cylinder 3 as long as it extends parallel to the longitudinal access of cylinder 3 to permit a piston 17, to be described later, to slide axially along the length of cylinder 3.

Positioned on the outside of piston rod 13 is metering means including mating threads on piston rod 13 and piston 17 capable of being adjusted to vary the resistance to fluid flow between second and third fluid conduit means F2 and F3 and first fluid conduit means F1 and cavity 21 in reverse function to the volume of cavity 21. As shown here, the means comprises a series of spiral threads 15 on rod 13 that span a substantial length thereof, however, they may be confined to a relatively narrow portion or series of portions thereof for specific instances. These spiral threads 15 form one portion of the resistance circuitry of device 1. Also positioned inside of cylinder 3 is an adjustable piston 17 whose face 19 defines a cavity 21 between it and the interior surface of closed cylinder end 5. Piston 17 is held in tight sealing relationship with the cylindrical inner surface of cylinder 3 by virtue of sealing or O rings 23 that are provided annularly about the maximum external diametrial portion of piston 17. Cavity 21 is therefore sealed against movement or escape of fluid except through passageways 9 and 11 at one side thereof and along spiral threads 15 on piston rod 13. Attached to piston 17 is a hollow rod 27 that includes inside spiral threads 29 that mate in engagement with complimental spiral threads 15 cn the outside of piston rod 13 to provide a passage for fluid flow therethrough and provide the adjustable resistance capability or valve means of device 1. Hollow rod 27 is shown in fluid communication with first fluid conduit means F1 by virtue of a threaded bore 31 into which is pressed tube 33 and fastened with fastening nut 35. At the opposite end of rod 27 is a vent means 37 which may be apertures or slots that permit the fluid flowing between the mating screw threads to be vented into cavity 21 between piston face 19 and the interior surface of closed cylinder end 5 (see FIG. 1).

In the operation of the device, the specific resistance or valving of fluid flow is obtained by unscrewing rod 27 from piston rod 13 so as to back piston 17 away from the interior surface of closed cylinder end 5. Since piston rod 13 is anchored fixedly to closed cylinder end 5, hollow rod 27 will in effect shorten the length of mating threaded surfaces 15 and 29 between the two rods and thereby decrease the resistance (open the valve) to fluid flow between the mating threads. The mating threads 15 and 29 perform dual functions; they regulate the flow therebetween by screwing or unscrewing them to adjust their mated length and they reduce the flow therebetween to laminar flow (via their resistance) which tends to dampen all minor flow fluctuations caused by turbulence or otherwise.

Simultaneously, cavity 21 increases in volume due to the separation of piston 17 from closed cylinder end 5 to provide increasing capacitance in the circuit. Fluid flowing into first fluid conduit means F1 passes up through the spiral opening defined by threads 15 and 29 to effect a lowering in pressure or pressure drop. The emerging fluid passes through vent 37 into cavity 21 where it is acted upon by the cap citance due to the volume of cavity 21 and thence passes out through passageways 9 and 11 into second and third fluid conduit means F2 and F3, respectively. The resistance and capacitance levels of device 1 may be set by hand (screwing or unscrewing rod 25) and thereafter will remain constant without the necessity of other control or positioning devices. Since there is no sideward or rotational torque produced by the passage of fluid through the device, there is no need to monitor or fasten the device in the position as it will hold its position without restraint.

Quite obviously, fluid may be passed into second and third fluid conduit means F2 and F3 and be acted upon first by the capacitance in cavity 21 and thereafter passed down through the spiral threaded valve opening defined by threads 15 and 29 to emerge from first fluid conduit means F1 so that the function of the device is capacitance-resistance in lieu of resistance-capacitance.

Spiral threads 29 on rod 27 may be formed along substantially the entire length of the rod to provide the greatest degree of resistance or valving capability or may be confined to a relatively narrow area along the rod to provide only that portion of the resistance desired. Likewise, piston 17 may be mounted intermediate the ends of hollow rod 27 to provide a set or base amount of capacitance in the device at maximum resistance (obtained by the setting of the two threaded rods.) As shown in FIG. 1, capacitance is reduced to virtually zero when resistance is at a maximum and conversely capacitance is maximized when resistance is reduced almost to zero.

FIG. 2 shows a portion of the same device as in FIG. 1 except that piston 17 is backed away from closed cylinder end 5 to show how a lowering in resistance of fluid flow between threads 15 and 29 gives rise to a concomitant increase in the volume of cavity 21 and therefore an increased capacitance function to the device. It should be noted at this point that more conduit means than the second and third (F2 and F3 may be attached to mounting nut 7 to operate additional slave stations (not shown) just as well as more conduit means than shown at F1 may be added to control further slave stations (not shown) down the line.

FIG. 3 shows a portion of the device of FIG. 1 and in schematic where the device may be used solely as an adjustable capacitance device by sealing off first fluid conduit means F1 by a plug 40 and bringing fluid into cavity 21 through second conduit means F2 and passing it back into the control stream through third fluid conduit means F3. By facing F2 and F3 oppositely as shown, the possibility of short circuited fluid flow is greatly reduced. The capacitance of this device is varied similarly to that of the other two embodiments by twisting hollow rod 27 with respect to piston rod 13 to move piston 17 away from closed cylinder end 5.

Hollow rod 27 and piston rod 13 need not be positioned on the longitudinal axis of cylinder 3 (although this is the preferred embodiment) and may be off-set from the longitudinal axis however, to move piston 17 with respect to closed cylinder end 5, piston rod 13 must be made to twist independent of cylinder 3 so as to drive piston 17 away from closed cylinder end 5 through an independent screw means as is conventionally known in the art.

What is claimed is:

1. An adjustable fluidic resistance-capacitance device comprising:
    a. first and second fluid conduit means;
    b. means for producing a variable resistance to fluidic flow therebetween and for interposing a variable capacitance therebetween wherein said resistance and said capacitance are reciprocal functions of one another, comprising:
        i. a cylinder closed at one end, said closed end in fluid communication with one of said fluid conduit means;
        ii. a piston rod in said cylinder;
        iii. an adjustable piston in said cylinder de-fining a cavity with said closed end; and,
        iv. metering means including mating threads on said piston rod and said piston capable of being adjusted to vary the resistance to fluid flow between the other of said fluid conduit means and said cavity in reverse function to the volume of said cavity; and c. a hollow rod attached to said piston and in fluid communication at one end with one of said conduit means and including inside spiral threads for mating engagement with complemental spiral threads on the outside of said piston rod for passage of fluid therethrough; and, d. means to convey said fluid, flowing from between said mating threads, to said cavity.

2. An adjustable fluidic resistance-capacitance device comprising:

a. first and second fluid conduit means;

b. means for producing a variable resistance to fluid flow therebetween and for interposing a variable capacitance therebetween wherein said resistance and said capacitance are reciprocal functions of one another, comprising:

i. a cylinder closed at one end, said closed end in fluid communication with one of said fluid conduit means;

ii. a piston rod in said cylinder;

iii. an adjustable piston in said cylinder defining a cavity with said closed end; and, iv. metering means including mating threads on said piston rod and said piston capable of being adjusted to vary the resistance to fluid flow between the other of said fluid conduit means and said cavity in reverse function to the volume of said cavity; and, c. a hollow rod attached to said piston and in fluid communication at one end with one of said conduit means and including inside spiral threads for mating engagement substantially along its entire length with complemental mating engagement with spiral threads on the outside of said piston rod for passage of fluid therethrough; and, d. means to convey said fluid, flowing from between said mating threads, to said cavity.

3. An adjustable fluidic resistance-capacitance device comprising:

a. first and second fluid conduit means;

b. means for producing a variable resistance to fluid flow therebetween and for interposing a variable capacitance therebetween wherein said resistance and said capacitance are reciprocal functions of one another, comprising:

i. a cylinder closed at one end, said closed end in fluid communication with one of said fluid conduit means;

ii. a piston rod in said cylinder;

iii. an adjustable piston in said cylinder defining a cavity with said closed end; and, iv. metering means including mating threads on said piston rod and said piston capable of being adjusted to vary the resistance to fluid flow between the other of said fluid conduit means and said cavity in reverse function to the volume of said cavity; and, c. a hollow rod attached at one end to said piston and in fluid communication at the opposite end with one of said conduit means and including inside spiral threads for mating engagement along its length with complemental spiral threads on the outside of said piston rod for passage of fluid therethrough; and, d. means to convey said fluid flowing from between said mating threads to said cavity.

4. An adjustable fluidic resistance-capacitance device comprising:

a. first, second, and third fluid conduit means; and, b. means connecting said first conduit means to said second and third conduit means, for producing a variable resistance to fluid flow equally therebetween and for interposing a variable capacitance therebetween wherein said resistance and said capacitance are reciprocal functions of one another, comprising:

i. a cylinder closed at one end, said closed end in fluid communication with said second and third conduit means;

ii. a piston rod in said cylinder;

iii. an adjustable piston in said cylinder defining a cavity with said closed end; and, iv. metering means including mating threads on said piston rod and said piston capable of being adjusted to vary the resistance to fluid flow between said first conduit and said cavity in reverse function to the volume of said cavity; and, c. a hollow rod attached to said piston and in fluid communication at one end with said first conduit means and including inside spiral threads for mating engagement with complemental spiral threads on the outside of said piston rod for passage of fluid therethrough; and, d. means to convey said fluid, flowing from between said mating threads, to said cavity.

5. An adjustable fluidic resistance-capacitance device comprising:

a. first, second, and third fluid conduit means;

b. means connecting said first conduit means to said second and third conduit means, for producing a variable resistance to fluid flow equally therebetween and for interposing a variable capacitance therebetween wherein said resistance and said capacitance are reciprocal functions of one another, comprising:

i. a cylinder closed at one end, said closed end in fluid communication with said second and third conduit means;

ii. a piston rod in said cylinder;

iii. an adjustable piston in said cylinder defining a cavity with said closed end; and, iv. metering means including mating threads on said piston rod and said piston capable of being adjusted to vary the resistance to fluid flow between said first conduit and said cavity in reverse function to the volume of said cavity; and, c. a hollow rod attached to said piston and in fluid communication at one end with said first conduit means and including inside spiral threads for mating engagement substantially along its entire length with complemental spiral threads on the outside of said piston rod for passage of fluid therethrough; and, d. means to convey said fluid, flowing from between said mating threads, to said cavity.

6. An adjustable fluidic resistance-capacitance device comprising:

a. first, second, and third fluid conduit means;

b. means connecting said first conduit means to said second and third conduit means, for producing a variable resistance to fluid flow equally therebetween and for interposing a variable capacitance therebetween wherein said resistance and said capacitance are reciprocal functions of one another, comprising:
i. a cylinder closed at one end, said closed end in fluid communication with said second and third conduit means;
ii. a piston rod in said cylinder;
iii. an adjustable piston in said cylinder defining a cavity with said closed end; and,
iv. metering means including mating threads on said piston rod and said piston capable of being adjusted to vary the resistance to fluid flow between said first conduit and said cavity in reverse function to the volume of said cavity; and,
c. a hollow rod attached at one end to said piston and in fluid communication at the opposite end with said first conduit means and including inside spiral threads for mating engagement along its length with complemental spiral threads on the outside of said piston rod for passage of fluid therethrough; and,
d. means to convey said fluid, flowing from between said mating threads, to said cavity.

* * * * *